(12) United States Patent
Senda et al.

(10) Patent No.: US 7,604,087 B2
(45) Date of Patent: Oct. 20, 2009

(54) MOTOR-DRIVEN POWER STEERING APPARATUS

(75) Inventors: Shunya Senda, Tochigi (JP); Akihiro Tamaki, Tochigi (JP)

(73) Assignee: Showa Corporation, Saitama (JP)

( * ) Notice: Subject to any disclaimer, the term of this patent is extended or adjusted under 35 U.S.C. 154(b) by 302 days.

(21) Appl. No.: 11/444,104

(22) Filed: May 31, 2006

(65) Prior Publication Data

US 2007/0144823 A1   Jun. 28, 2007

(30) Foreign Application Priority Data

Nov. 29, 2005   (JP) .............................. 2005-344570

(51) Int. Cl.
*B62D 5/04* (2006.01)
(52) U.S. Cl. ...................................................... 180/446
(58) Field of Classification Search ................. 180/204, 180/446; 701/41, 42
See application file for complete search history.

(56) References Cited

U.S. PATENT DOCUMENTS

| | | | | |
|---|---|---|---|---|
| 4,681,183 | A * | 7/1987 | Oshita | 180/446 |
| 5,528,497 | A * | 6/1996 | Yamamoto et al. | 701/41 |
| 6,129,172 | A * | 10/2000 | Yoshida et al. | 180/446 |
| 6,184,637 | B1 * | 2/2001 | Yamawaki et al. | 318/432 |
| 6,408,234 | B1 * | 6/2002 | Wittig | 701/41 |
| 6,424,895 | B1 * | 7/2002 | Shimizu et al. | 701/41 |
| 7,075,456 | B2 * | 7/2006 | Tanaka et al. | 340/932.2 |
| 7,181,325 | B2 * | 2/2007 | Niessen et al. | 701/41 |

* cited by examiner

*Primary Examiner*—Tony H. Winner
(74) *Attorney, Agent, or Firm*—Orum & Roth LLC

(57) ABSTRACT

In a motor-driven power steering apparatus which converts a rotation of an electric motor into a linear stroke of a rack shaft by a power transmission mechanism, and steers a wheel coupled to the rack shaft, there is provided an automatic neutral restoring means for judging a vehicle stop and a manual steering rest, and rotating the electric motor as to restore a detected steering angle of a steering angle sensor to a neutral position so as to execute an automatic steering, when the steering angle is out of the neutral position.

7 Claims, 4 Drawing Sheets

MOTOR-DRIVEN POWER STEERING APPARATUS

BACKGROUND OF THE INVENTION

1. Field of the Invention

The present invention relates to a motor-driven power steering apparatus.

2. Description of the Related Art

A motor-driven power steering apparatus detects a steering torque of a steering system by a steering torque sensor. The apparatus sets a target current on the basis of the detected steering torque, drive controls an electric motor on the basis of a pulse width modulation (PWM) signal obtained by applying a proportional integral (PI) compensation to a deviation between a target current and a current actually flowing through the electric motor so as to linearly stroke a rack shaft, and applies a steering assist force to a wheel coupled to the rack shaft. This type of apparatus is described in Japanese Patent Application Laid-open No. 6-8839 (patent document 1).

When a vehicle is in a traveling state, the vehicle has the tendency of restoring a steering angle to a neutral position on the basis of a straight travel restoring function of the vehicle. However, in a vehicle stop state in which the straight travel restoring function is not executed, if a driver pauses manual steering by detaching a hand from the steering wheel or the like, the steering angle stops at a steering angle position where the driver made the pause of the manual steering without returning to the neutral position.

Accordingly, in the case of making a stop while turning the steering wheel by manual steering for parallel parking or the like, the steering wheel starts moving from the turned steering angle when next starting the vehicle. Accordingly, there is a risk that the vehicle is brought into contact with a peripheral obstacle. In order to prevent the contact, it is necessary to check out the turning angle (the steering angle position) of the wheel before the driver gets in the vehicle.

SUMMARY OF THE INVENTION

An object of the present invention is to do away with the necessity that a driver checks out the turning angle of a wheel by detecting a state in which a vehicle stops while a steering wheel is turned, and automatically restoring the wheel steering angle to a neutral position.

The present invention relates to a motor-driven power steering apparatus converting rotation of an electric motor into a linear stroke of a rack shaft by a power transmission mechanism and steering a wheel coupled to the rack shaft. The motor-driven power steering apparatus includes an automatic neutral restoring means for judging a vehicle stop and a manual steering rest. The electric motor of the device is rotated in such a manner as to restore a detected steering angle of a steering angle sensor to a neutral position so as to execute automatic steering, when the steering angle exists out of the neutral position.

BRIEF DESCRIPTION OF THE DRAWINGS

The present invention will be more fully understood from the detailed description given below and from the accompanying drawings which should not be taken to be a limitation on the invention, but are for explanation and understanding only. The drawings.

DESCRIPTION OF THE PREFERRED EMBODIMENTS

Figure 1:
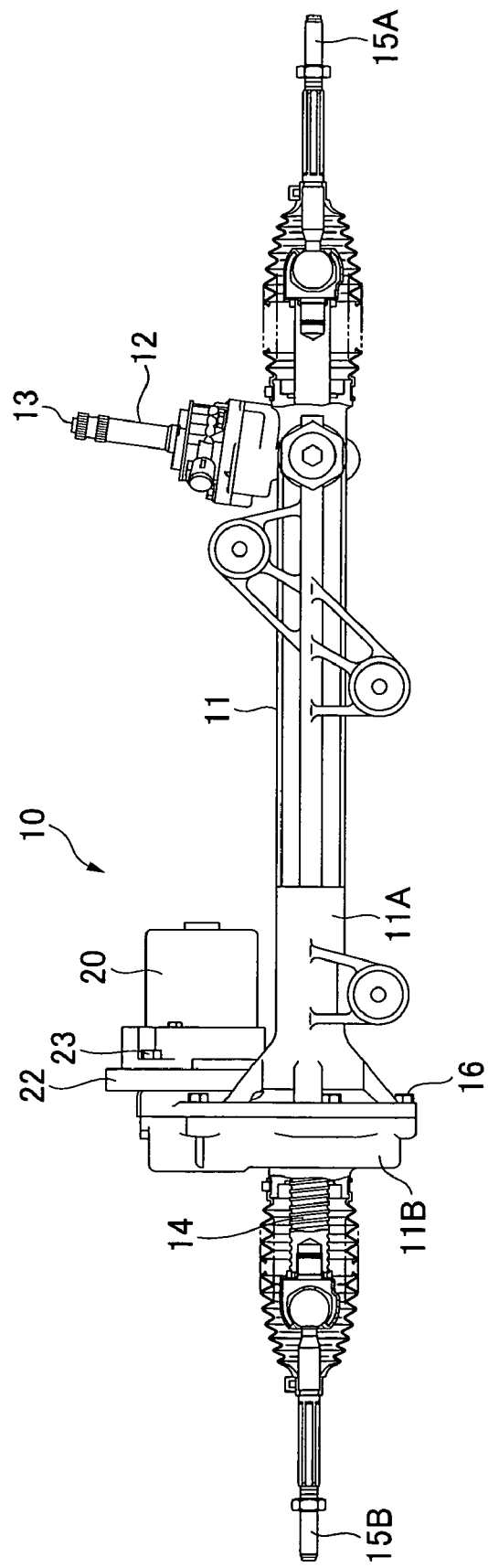
FIG. 1 is a front elevational view showing a motor-driven power steering apparatus.

A motor-driven power steering apparatus 10 structure is shown in FIG. 1. A first gear housing 11A and a second gear housing 11B are provided by dividing a gear housing 11. An input shaft 12 to which a steering wheel is coupled is supported to the gear housing 11 (the first gear housing 11A). An output shaft (not shown) is coupled to the input shaft 12 via a torsion bar 13 (not shown). A pinion (not shown) is provided in the output shaft. A rack shaft 14 engaging with the pinion is supported to the gear housing 11 so as to be movable linearly in a lateral direction. A steering torque sensor 41 is provided between the input shaft 12 and the output shaft. The steering torque sensor 41 detects a steering torque on the basis of a relative rotational displacement amount generated between the input shaft 12 and the output shaft due to an elastic torsional deformation of a torsion bar caused by steering torque of a manual steering input applied to a steering wheel, and outputs a steering torque signal Ts.

The motor-driven power steering apparatus 10 is structured such that both end portions of the rack shaft 14 are protruded to both sides of the gear housing 11 (the first gear housing 11A and the second gear housing 11B), and tie rods 15A and 15B are coupled to end portions thereof. Left and right wheels can be steered via the tie rods 15A and 15B working with a linear movement of the rack shaft 14.

Figure 2:
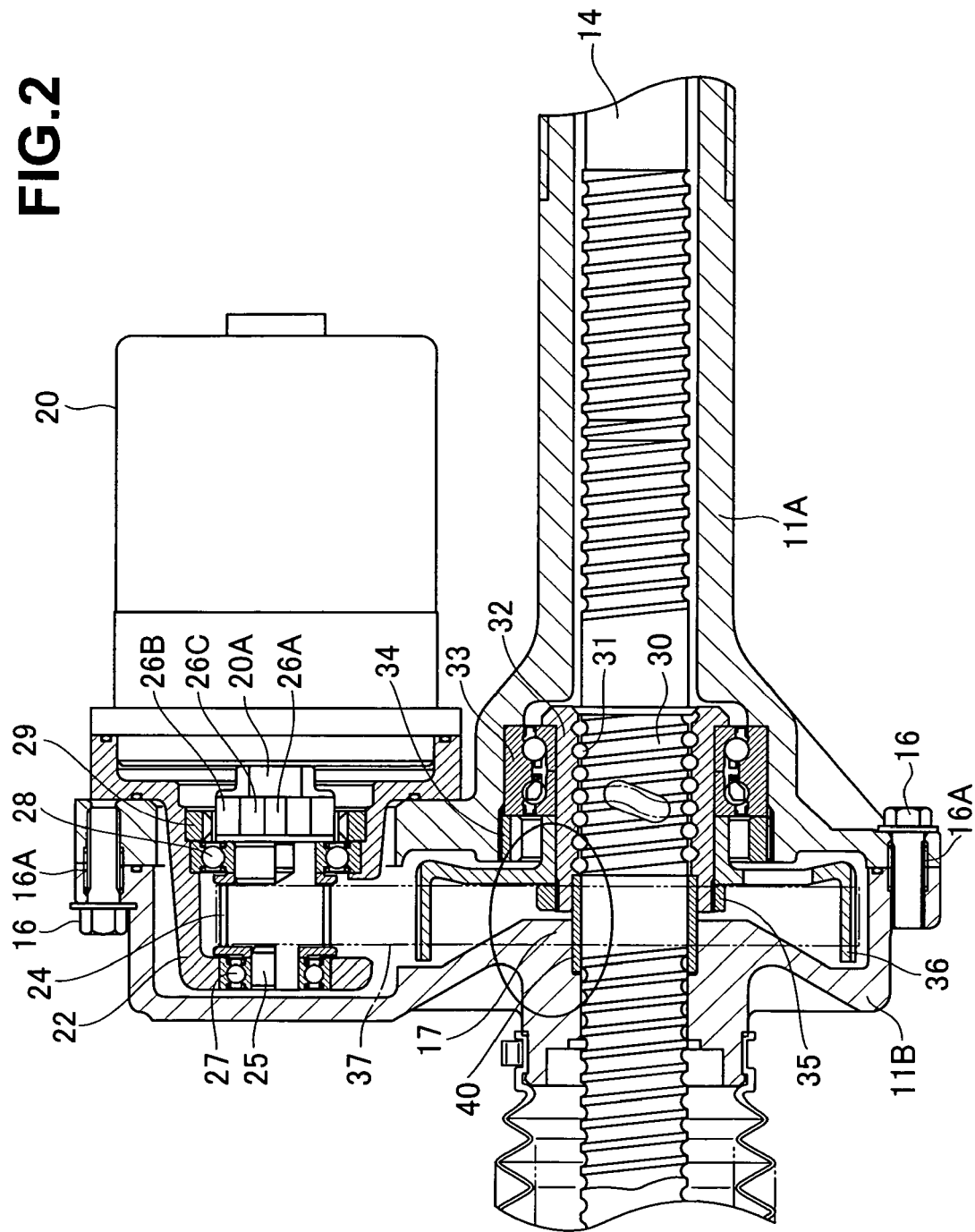
FIG. 2 is a cross sectional view showing a main portion of the motor-driven power steering apparatus.

The motor-driven power steering apparatus 10 is structured, as shown in FIG. 2, such that an electric motor 20 is fixed to a holder 22 by a mounting bolt 21 (not shown). The holder 22 can be attached to and detached from the first gear housing 11A by a mounting bolt 23. The holder 22 attached to the first gear housing 11A and inserted to an inner portion of the first gear housing 11A has a fixed gap with respect to inner peripheries of the gear housings 11A and 11B. Oscillation of the holder 22 is allowed with respect to the first gear housing 11A. It is possible to adjust tension of a belt 37 wound around a drive pulley 24 and a driven pulley 36 which are supported to the holder 22 in a manner mentioned below.

The holder 22 supports a center axis 25 of the drive pulley 24, and engages and attaches a joint 26A in an axial end of a rotating shaft 20A of the electric motor 20 and a joint 26B in an axial end of the center axis 25 with each other from an axial direction. An intermediate joint 26C such as a rubber or the like is pinched between teeth provided at a plurality of positions in a peripheral direction. The drive pulley 24 is supported at both end portions of the center axis 25 to the holder 22 by bearings 27 and 28. Reference numeral 29 denotes a stop ring for fixing an outer ring of the bearing 28.

The motor-driven power steering apparatus 10 is structured such that a ball screw 30 is provided in the rack shaft 14. A ball nut 32 engaging with the ball screw 30 via a ball 31 is provided. The ball nut 32 is rotatably supported by a bearing 33 supported to the gear housing 11 (the first gear housing 11A). Reference numeral 34 denotes a nut for fixing an outer ring of the bearing 33. The driven pulley 36 is fixed to an outer periphery of the ball nut 32 by a lock nut 35.

The motor-driven power steering apparatus 10 is structured such that the belt 37 is wound around the drive pulley 24 in a side of the electric motor 20, and the driven pulley 36 in a side of the ball nut 32. The rotation of the electric motor 20 is transmitted to the ball nut 32 via the drive pulley 24, and the belt 37 and the driven pulley 36, and is converted into a linear stroke of the rack shaft 14 by extension, thereby linearly moving the rack shaft 14. Accordingly, the electric motor 20 applies a steering assist force to a steering system.

The motor-driven power steering apparatus 10 is structured such that the rack shaft 14 supported to the first gear housing 11A is passed through the second gear housing 11B. The holder 22 attached to the first gear housing 11A is covered by the second gear housing 11B. The first gear housing 11A and the second gear housing 11B are fastened by a plurality of fastening bolts 16. The first gear housing 11A and the second gear housing 11B are positioned by striking both end portions of a plurality of tubular knock pins 16A and are thereafter engaged and fastened by the fastening bolts 16 inserted to the respective knock pins 16A, as shown in FIG. 2. A part of the fastening bolts 16 is engaged with the first gear housing 11A through the knock pin 16A, and the other fastening bolts 16 are fastened to the second gear housing 11B through the knock pin 16A.

The motor-driven power steering apparatus 10 is provided with the following structure for making an oscillation of the rack shaft 14 supported to the gear housings 11A and 11B small.

In the second gear housing 11B, a portion facing to the ball nut 32 supported to the first gear housing 11A is set to a bush support portion 17, and a bush 40 is bridged between the ball nut 32 and the bush support portion 17. The bush 40 is pressed into a leading end side inner peripheral portion of the ball nut 32 so as to be fixedly provided. The rack shaft 14 is supported in a linearly slidable manner to an inner peripheral portion of the bush support portion 17 so as to be rotationally slidable.

The bush 40 sets a part in an axial direction of an outer periphery of a tube body made of a metal or the like to a slidable portion with the bush support portion 17, and sets an entire portion of an inner periphery to a slidable portion with the rack shaft 14. The slidable portion is obtained by forming a lubricating coating layer made of an oil-contained polyacetal, a tetrafluoroethylene or the like on a surface of the tube body in accordance with a coating or the like.

Figure 3:
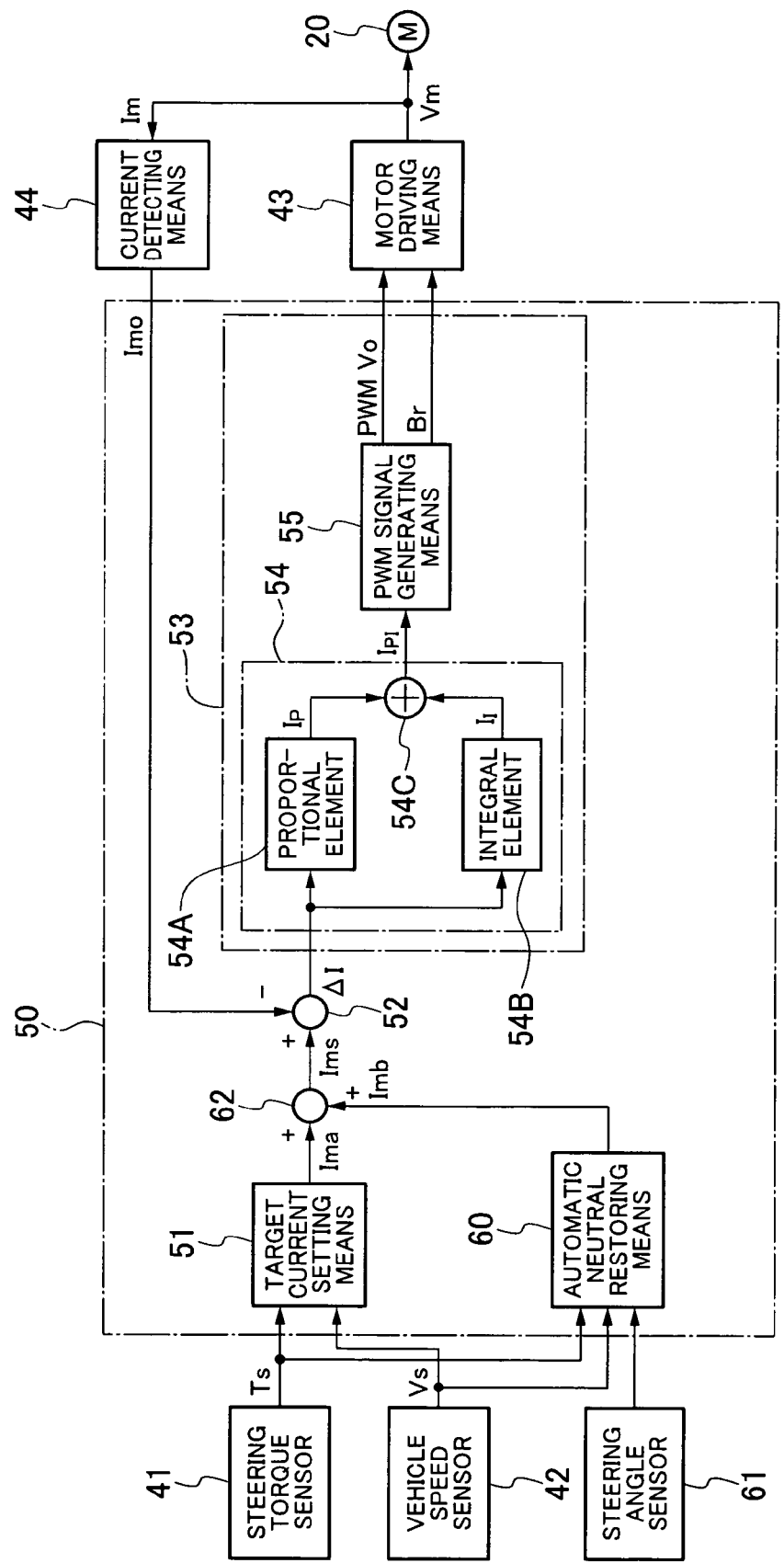
FIG. 3 is a block diagram showing a control system of the motor-driven power steering apparatus.

The motor-driven power steering apparatus 10 has the following control means 50 for the electric motor 20 (FIG. 3).

A control means 50 is accessorily provided with a steering torque sensor 41 and a vehicle speed sensor 42. The steering torque sensor 41 detects the steering torque of the steering system and outputs the steering torque signal Ts to the control means 50 as mentioned above. The vehicle speed sensor 42 detects a vehicle speed and outputs a vehicle speed signal Vs to the control means 50.

The control means 50 has various arithmetic processing means, signal generating means, memories or the like on the basis of a microprocessor. The control means 50 generates a drive control signal V0 (PWM signal) to which a proportional control (P) and an integral control (I) are applied, thereby driving and controlling the motor driving means 43.

The motor driving means 43 is structured by a bridge circuit constituted by four switching elements, for example, four power field effect transistors (FET), insulated gate bipolar transistors (IGBT) or the like, outputs a motor voltage Vm on the basis of the drive control signal V0, and drives the electric motor 20. When the steering wheel is steered in a clockwise direction, the steering assist force is applied to the steering system in such a manner that the front wheels are turned in a clockwise direction, for example, by positively rotating the electric motor 20.

The control means 50 is accessorily provided with a current detecting means 44. The current detecting means 44 detects a motor current Im actually flowing through the electric motor 20, and feeds back a detected current signal Imo converted into a digital signal corresponding to the motor current Im to the control means 50 (negative feedback).

The control means 50 has a target current setting means 51, a deviation computing means 52 and a current control computing means 53.

The target current setting means 51 is provided with a memory such as a read only memory (ROM) or the like. The target current setting means 51 reads an assist current signal Ima with respect to a steering torque signal Ts having the vehicle speed signal Vs as a parameter from the steering torque signal Ts output by the steering torque sensor 41, and a target current signal Ims map previously stored in the memory on the basis of the steering torque signal Ts and the vehicle speed signal Vs output by the vehicle speed sensor 42. The target current setting means 51 outputs the assist current signal Ima as the target current signal Ims to the deviation computing means 52.

The deviation computing means 52 computes a deviation (Ims−Imo) between the target current signal Ims and the detected current signal Imo, and outputs a deviation signal ΔI to the current control computing means 53.

The current control computing means 53 gives a direction (a rotational direction of the electric motor 20) polarity signal Br and a PWM signal V0 corresponding to a duty ratio to the motor driving means 43 of the electric motor 20 in correspondence to the deviation signal ΔI between the target current signal Ims and the detected current signal Imo.

The current control computing means 53 is constituted by a proportional integral (PI) control means 54, and a PWM signal generating means 55.

The PI control means 54 is provided with a proportional element 54A generating a proportional sensitivity KP so as to execute a proportional control, an integral element 54B generating an integral gain 1I so as to execute an integral control, and an adder adding output signals of the proportional element 54A and the integral element 54B. The proportional element 54A and the integral element 54B are connected in parallel. The proportional element 54A and the integral element 54B respectively output a proportional signal IP obtained by multiplying the deviation signal ΔI by the proportional sensitivity KP and an integral signal II obtained by applying an integral process having an integral gain KI to the deviation signal ΔI to the adder 54C. The adder 54C adds the proportional signal IP and the integral signal II, and outputs the proportional integral signal IPI (IP+II) toward the PWM signal generating means 55.

The PWM signal generating means 55 outputs a direction polarity signal Br corresponding to a direction and a magnitude of the proportional integral signal IPI and a PWM signal corresponding to the duty ratio as a drive control signal V0 toward the motor driving means 43. The motor driving means 43 drives the electric motor 20 on the basis of a motor drive voltage Vm.

Accordingly, the control means 50 executes the following assist control with respect to the electric motor 20 of the motor-driven power steering apparatus 10.

(1) When the steering torque detected by the steering torque sensor 41 is lower than a predetermined value, the steering assist force is not necessary, and the electric motor 20 is not driven.

(2) When the steering torque detected by the steering torque sensor 41 is more than the predetermined value, a steering assist force is necessary. Accordingly, the electric motor 20 is driven so as to be normally rotated, and assist control is executed. The rotating force of the electric motor 20 is transmitted to the ball nut 32 via the drive pulley 24, the belt 37 and the driven pulley 36, and is formed as a steering assist force linearly stroking the rack shaft 14 via the ball screw 30.

Accordingly, for executing an automatic neutral restoring process of preventing the condition in which the vehicle stops while the steering wheel is turned, and in order to do away with the necessity that the driver checks out the turning angle of the wheel at a time of starting, the motor-driven power steering apparatus 10 is provided with an automatic neutral restoring means 60 in the control means 50, and is accessorily provided with a steering angle sensor 61 in the automatic neutral restoring means 60. The steering angle sensor 61 detects a steering angle of the steering wheel (the input shaft 12), and outputs a steering angle signal θs to the control means 50.

The automatic neutral restoring means 60 judges a manual steering rest (a hand release from the steering wheel or the like) of the vehicle, executes the automatic neutral restoring process when the detected steering angle of the steering angle sensor 61 is out of the neutral position, and rotates the electric motor 20 in such a manner as to restore the steering angle to the neutral position so as to execute automatic steering. In the present embodiment, the vehicle stop is judged on the basis that the detected result of the vehicle speed sensor 42 is the vehicle speed Vs=0 km/hour. Further, the manual steering rest is judged on the basis that the detected result of the steering torque sensor 41 is the steering torque Ts≈0 kgf·cm.

The automatic neutral restoring means 60 performs the following functions. It previously defines a proper angular velocity signal ωs map which is optimum for slowly returning the steering angle of the steering wheel to the neutral position in correspondence to each of the steering angles θs, on the basis of the steering angle θs of the automatic steering serving as a parameter. It previously defines a correction current signal Imb map for the electric motor 20 necessary for achieving each of the angular velocity signals ωs, on the basis of the angular velocity signal θ)s serving as a parameter. It also stores the maps in a memory such as a read only memory (ROM) or the like. Further, the automatic neutral restoring means 60 reads the correction current signal Imb of the electric motor 20 necessary for making the angular velocity (the angular velocity calculated by differentiating the detected steering angle signal θs) of the automatic steering. It does so on the basis of rotation of the electric motor 20 in conformity with the proper angular velocity signal ωs in correspondence to the detected steering angle signal θs from the maps, when restoring the steering angle to the neutral position by using the detected steering angle signal θs of the steering angle sensor 61, in the automatic neutral restoring process, and outputs the correction current signal Imb toward the adder 62. The control means 50 sets a value obtained by the correction current signal Imb corresponding to the output of the automatic neutral restoring means 60 to the assist current signal Ima (generally, Ima=0 A at a time of the vehicle stop and the manual steering rest) output by the target current setting means 51 by the adder 62 to the target current signal Ims mentioned above, and outputs it toward the deviation computing means 52.

The automatic neutral restoring means 60 cancels the automatic steering when judging the vehicle stop cancel on the basis of the detected result of the vehicle speed sensor 42 or the manual steering rest cancel on the basis of the detected result of the steering torque sensor 41, during the automatic steering in accordance with the automatic neutral restoring process. Accordingly, the control means 50 returns to the normal assist control.

Figure 4:
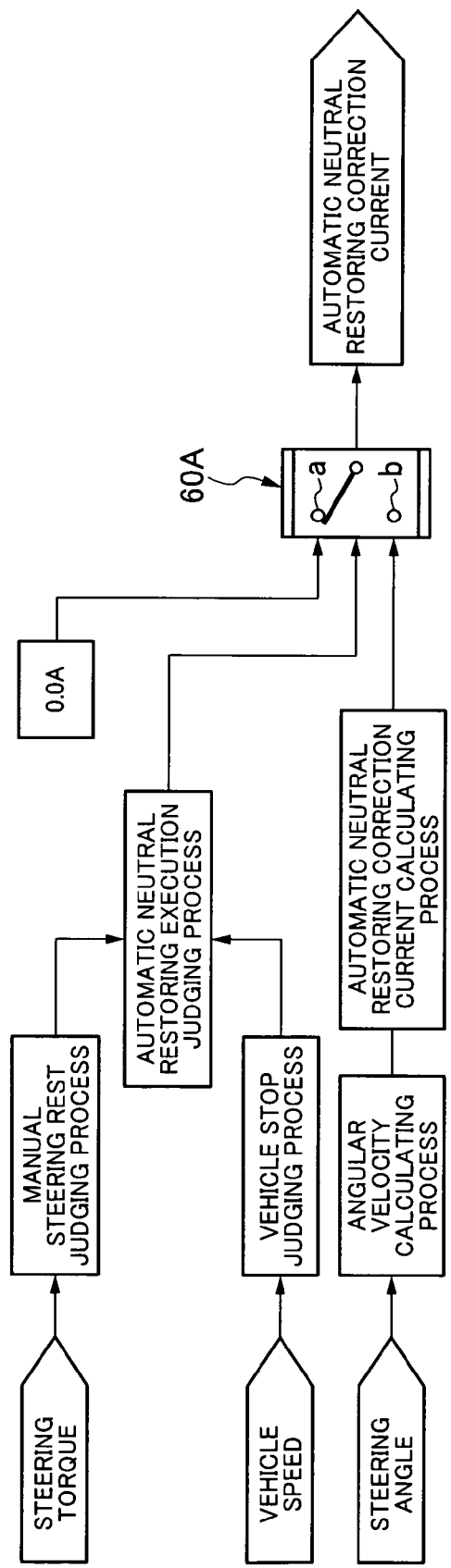
FIG. 4 is a flow chart showing a procedure of an automatic neutral restoring process.

The automatic neutral restoring process by the automatic neutral restoring means 60 is executed as follows (FIG. 4).

(1) When the vehicle speed signal Vs corresponding to the detected result of the vehicle speed sensor 42 is 0 km/hour, the automatic neutral restoring means 60 executes the vehicle stop judging process corresponding to the condition that the vehicle is stopped. When the steering torque signal Ts corresponding to the detected result of the steering torque sensor 41 is 0 kgf·cm, the automatic neutral restoring means 60 executes the manual steering rest judging process corresponding to the manual steering rest state. When the vehicle stop judging process and the manual steering rest judging process are simultaneously judged, the automatic neutral restoring means 60 executes the automatic neutral restoring execution judging process, and switches a selector switch 60A from an off terminal (0.0 A terminal) a to an on terminal b.

(2) The automatic neutral restoring means 60 reads the proper steering angular velocity signal ωs in correspondence to the detected steering angle signal θs of the steering sensor 61 from the map mentioned above, calculates the actual steering angular velocity by differentiating the detected steering angle signal θs, and reads the correction current signal Imb of the electric motor 20 necessary for making the calculated steering angular velocity in conformity with the proper steering angular velocity signal ωs mentioned above from the map independently. In this case, the correction current signal Imb may be calculated by multiplying the deviation between the calculated steering angular velocity and the proper steering angular velocity by a predetermined conversion coefficient.

(3) The automatic neutral restoring means 60 outputs the correction current signal Imb of the electric motor 20 to the adder 62 via the on terminal b of the selector switch 60A. The adder 62 adds the correction current signal Imb mentioned above output by the automatic neutral restoring means 60 to the assist current signal Ima output by the target current setting means 51, and outputs it as the target current signal Ims mentioned above toward the deviation computing means 52.

(4) When judging the vehicle stop cancel or the manual steering rest cancel on the basis of the detected result of the steering torque sensor 41, the automatic neutral restoring means 60 cancels the automatic neutral restoring execution judging process in the item (1) mentioned above, and switches the selector switch 60A to the off terminal (0.0 A terminal) a. Accordingly, the output of the correction current signal Imb from the automatic neutral restoring means 60 to the adder 62 is lost, and the control means 50 is returned to the normal assist control mode.

In the case that the off of the ignition switch is detected while the automatic neutral restoring means 60 is under the automatic steering by the automatic neutral restoring process, the control means 50 is stopped after the automatic neutral restoring process is finished.

In accordance with the present embodiment, the following operations and effects can be achieved.

(a) The steering angle in the case that the vehicle is under stopped conditions always exists in a neutral position in accordance with the automatic neutral restoring process of rotating the electric motor 20 so as to automatically steer in such a manner as to restore the steering angle detected by the steering sensor 61 to the neutral position. Accordingly, the driver is not sensitive about the turning angle of the wheel at a time of getting on the vehicle, where the vehicle may otherwise suddenly start moving in the lateral direction so as to be potentially brought into contact with a peripheral obstacle when the vehicle starts.

(b) When the vehicle stop is cancelled so as to start traveling or the manual steering rest is cancelled and the manual steering is started, under the automatic neutral restoring process, the automatic neutral restoring process is cancelled. Accordingly, the process is moved to the normal steering assist process, and the steering assist force calculated on the basis of the detected torque of the steering torque sensor 41 is applied.

(c) In the automatic neutral restoring process, the steering angular velocity of the automatic steering executed by rotating the electric motor 20 in such a manner as to restore the steering angle detected by the steering angle sensor 61 to the neutral position is made in conformity with the proper steering angular velocity which is previously determined in correspondence to the steering angle. Accordingly, it is possible to execute slow and smooth automatic steering in such a manner as to be at a low speed, for example, about 45 degree/sec at the steering angle away from the neutral position, and be further reduced in speed so as to be naturally stopped near the neutral position.

(d) The automatic neutral restoring means 60 can accurately judge the vehicle stop on the basis of the detected result of the vehicle speed sensor 42, and can accurately judge the manual steering rest on the basis of the detected result of the steering torque sensor 41.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof Therefore, the present invention should not be understood as limited to the specific embodiment set out above, but should be understood to include all possible embodiments which can be encompassed within a scope of equivalents thereof with respect to the features set out in the appended claims.

What is claimed is:

1. A motor-driven power steering apparatus for converting rotation of an electric motor into a linear stroke of a rack shaft by a power transmission mechanism and steering a wheel coupled to the rack shaft, comprising:
    an automatic neutral restoring means for judging a vehicle stop and a manual steering rest, and for rotating the electric motor in such a manner as to restore a detected steering angle of a steering angle sensor to a neutral position so as to execute an automatic steering, when the steering angle is out of the neutral position,
    wherein when the automatic neutral restoring means judges the vehicle stop cancel or the manual steering rest cancel under the automatic steering, the automatic neutral restoring means cancels the automatic steering.

2. A motor-driven power steering apparatus as claimed in claim 1, wherein when the automatic neutral restoring means previously determines a proper steering angular velocity in correspondence to the steering angle and restores the steering angle to the neutral position by using the detected steering angle of the steering angle sensor, the automatic neutral restoring means drives and controls the electric motor in such a manner as to make the angular velocity of the automatic steering by the electric motor in conformity with the proper steering angular velocity.

3. A motor-driven power steering apparatus as claimed in claim 2, wherein the automatic neutral restoring means judges the vehicle stop on the basis of the detected result of the vehicle speed sensor, and judges the manual steering rest on the basis of the detected result of the steering torque sensor.

4. A motor-driven power steering apparatus as claimed in claim 2, wherein the automatic neutral restoring means previously defines a proper angular velocity signal map which is optimum for returning the steering angle of the steering wheel to the neutral position in correspondence to each of the steering angles, on the basis of the steering angle of the automatic steering serving as a parameter, previously defines a correction current signal map for the electric motor necessary for achieving each of the angular velocity signals, on the basis of the angular velocity signal serving as a parameter, and stores the proper angular velocity signal map and the correction current signal map in a memory, and
    the automatic neutral restoring means reads the proper steering angular velocity signal in correspondence to the detected steering angle signal of the steering sensor from the maps, calculates an actual steering angular velocity on the basis of the detected steering angle signal, and reads a correction current signal of the electric motor necessary for making the calculated steering angular velocity in conformity with the proper steering angular velocity signal form the correction current signal map, thereby driving and controlling the electric motor.

5. A motor-driven power steering apparatus as claimed in claim 1, wherein the automatic neutral restoring means judges the vehicle stop on the basis of the detected result of the vehicle speed sensor, and judges the manual steering rest on the basis of the detected result of the steering torque sensor.

6. A motor-driven power steering apparatus for converting rotation of an electric motor into a linear stroke of a rack shaft by a power transmission mechanism and steering a wheel coupled to the rack shaft, comprising:
    an automatic neutral restoring means for judging a vehicle stop and a manual steering rest, and for rotating the electric motor in such a manner as to restore a detected steering angle of a steering angle sensor to a neutral position so as to execute an automatic steering, when the steering angle is out of the neutral position,
    wherein when the automatic neutral restoring means previously determines a proper steering angular velocity in correspondence to the steering angle and restores the steering angle to the neutral position by using the detected steering angle of the steering angle sensor, the automatic neutral restoring means drives and controls the electric motor in such a manner as to make the angular velocity of the automatic steering by the electric motor in conformity with the proper steering angular velocity, and
    wherein the automatic neutral restoring means previously defines a proper angular velocity signal map which is optimum for returning the steering angle of the steering wheel to the neutral position in correspondence to each of the steering angles, on the basis of the steering angle of the automatic steering serving as a parameter, previously defines a correction current signal map for the electric motor necessary for achieving each of the angular velocity signals, on the basis of the angular velocity signal serving as a parameter, and stores the proper angular velocity signal map and the correction current signal map in a memory, and the automatic neutral restoring means reads the proper steering angular velocity signal in correspondence to the detected steering angle signal of the steering sensor from the maps, calculates an actual steering angular velocity on the basis of the detected steering angle signal, and reads a correction current signal of the electric motor necessary for making the calculated steering angular velocity in conformity with the proper steering angular velocity signal from the correction current signal map, thereby driving and controlling the electric motor.

7. A motor-driven power steering apparatus as claimed in claim 6, wherein the automatic neutral restoring means judges the vehicle stop on the basis of the detected result of the vehicle speed sensor, and judges the manual steering rest on the basis of the detected result of the steering torque sensor.

* * * * *